T. BROOKFIELD.
HOSE PIPE COUPLING.
APPLICATION FILED DEC. 16, 1911.
1,038,840.
Patented Sept. 17, 1912.
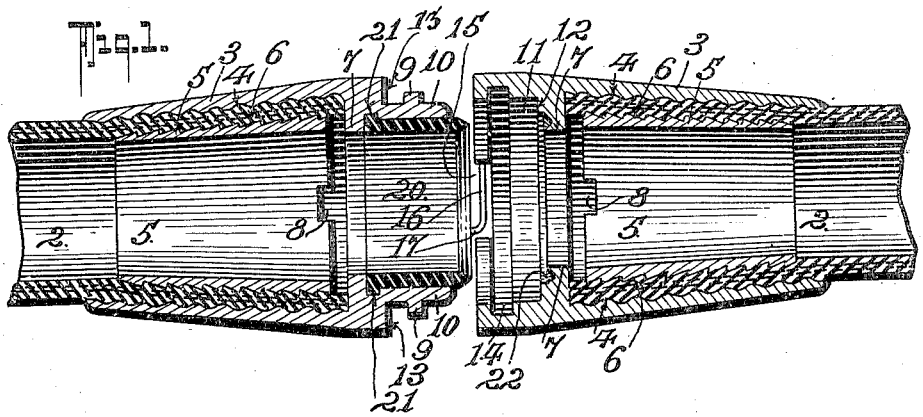
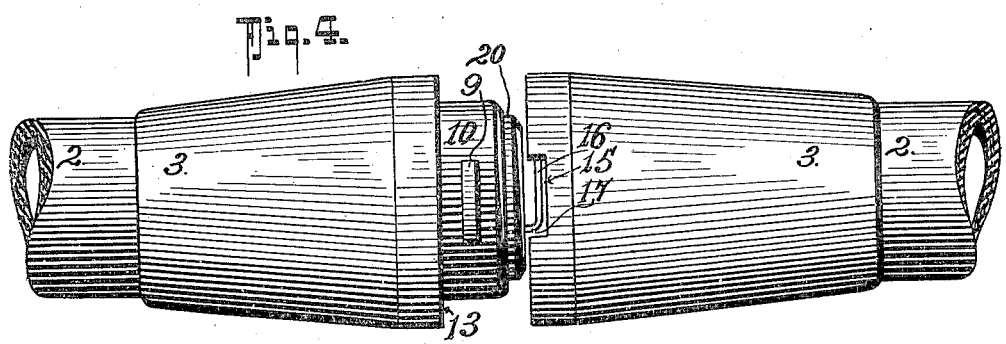
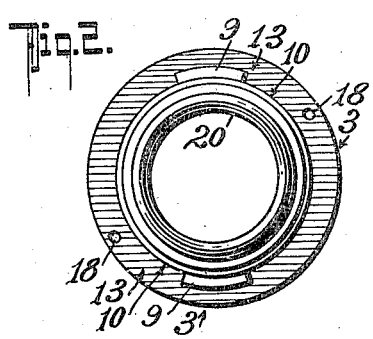
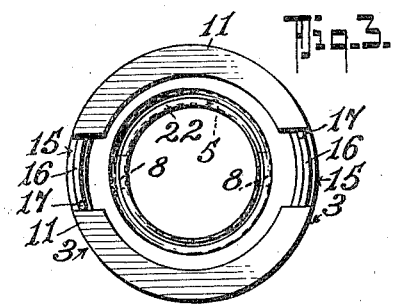
WITNESSES:
H. Woodard
John S. Schrott
INVENTOR
Theodore Brookfield
BY
Fred G. Dieterich
ATTORNEYS

UNITED STATES PATENT OFFICE.

THEODORE BROOKFIELD, OF KAMLOOPS, BRITISH COLUMBIA, CANADA.

HOSE-PIPE COUPLING.

1,038,840.   Specification of Letters Patent.   Patented Sept. 17, 1912.

Application filed December 16, 1911. Serial No. 666,134.

*To all whom it may concern:*

Be it known that I, THEODORE BROOKFIELD, citizen of the Dominion of Canada, residing at Kamloops, in the Province of British Columbia, Canada, have invented a new and useful Hose-Pipe Coupling, of which the following is a specification.

This invention relates to a coupling for a hose pipe for the conveyance of a fluid under pressure, the object of the invention being to provide a simple and readily connected coupling free from external projections which interfere with the endwise moving of the pipe while dragging it along the ground, as in the case of a fire hose. These objects are attained principally by the use of a joint closure, which is acted upon to seal the joint, by the fluid pressure in the pipe whereby the connection does not require the provision of separate devices to tighten the joint and the necessity for outwardly projecting studs or like projections is dispensed with.

The invention is particularly described in the following specification, reference being made to the drawings by which it is accompanied, in which:

Figure 1 is a longitudinal section of the coupling, the two ends drawn a slight distance apart. Fig. 2 is an end view of the male part of the coupling, and Fig. 3, an end view of the female part. Fig. 4 is an outside elevation showing the manner of securing the coupling against rotation and accidental release, the two ends drawn apart.

The construction of the coupling may be divided into what is required for the performance of three general functions; the manner of securing the coupling ends to the hose pipe, the manner of securing the two parts of the coupling together, and the manner of effecting the closure of the coupling joint.

In these drawings 2 represents the hose pipe, the ends of which are inserted each into a coupling end or sleeve 3, which is the same for both male and female or spigot and faucet ends. The end of each is bored or cast conical, enlarging toward the coupling joint, and is provided with serrations 4. In each conical sleeve end 3 is inserted a conical bushing 5, the outer surface of which is provided with serrations 6 preferably formed as a screw thread and offering square shoulders against withdrawal. The larger end of this bushing 5 is such as will pass through the smaller end of the sleeve 3 and will rest against a shoulder 7 of the coupling end. The bushing 5 being inserted in the conical sleeve end 3, the end of the hose pipe 2 is entered in the annular space between the inner bore of the sleeve 3 and the outside of the bushing 5 and is forcibly pressed in until approximately against the shoulder 7. Owing to the square shoulders of the serrations 6 in the bushing 5, if an attempt be made to withdraw the hose pipe, it may slip in the outer sleeve 3 but the bushing 5 will be retained with the hose pipe and the larger diameter of the bushing will be drawn toward the smaller diameter of the sleeve and tightly gripped. No difficulty will be experienced in making this connection so secure that the hose cannot be withdrawn. The hose pipe 2 will either tear apart, the sleeve 3 burst, or the bushing 5 collapse by crushing. This dispenses with any necessity for clasping bands which form an objectionable obstruction.

To facilitate the entrance of the hose pipe onto the bushing 5 and more particularly the removal of it the bushing 5 is furnished with slots 8 on its end face, in which slots any suitable driving key may be inserted and the ridges 6 forming a screw thread rotation of the bushing in relation to the hose pipe with aid the entrance of the hose pipe or effect its withdrawal.

The secondary part of the coupling is the means by which the male spigot 10 is secured in the faucet recess 11 provided for its reception. This spigot portion 10 is plainly cylindrical with the outer end rounded, as shown. The faucet recess 11 is cylindrical so that when spigot 10 is inserted it will fit neatly but not tightly in the recess and will butt against the shoulder 12. On diametrically opposite sides of the outer surface of the spigot and about its mid-length are projections 9 each in length about one-sixth of the circumference. The engaging faces of these projections are parallel to the shoulder 13, so that they have no tightening effect to draw the joint to a closure. In the faucet recess 11 is an annular groove 14, which corresponds with the projections 9 of the other end of the coupling and portions 15 are removed from the outer face of the faucet to form a passage for the members 9 to this groove, so that the spigot may be inserted in the faucet when the projections 9 are opposite to the removed portions 15 and being turned these projections will prevent the coupling being drawn apart until the ends are again rotated to bring the projections opposite to the removed portions.

To retain the two parts of the coupling in the locked position against accidental rotation light springs 16 of steel wire are inserted in the recesses 15 the outwardly turned ends 17 of which will, when the coupling is turned to the holding position, enter apertures 18 in the shoulder face 13. Means is thus provided whereby the two parts of the coupling are secured together in a strong and simple manner.

It remains now to describe how the sealing or closure of the joint of the coupling is effected by the fluid pressure when admitted to the pipe. This is accomplished by a thin cylindrical ring 20 inserted in a shouldered recess in the spigot or male end of the coupling, an annular groove 21 being provided adjacent to the shoulder 7 into which groove the rubber will expand and which will retain it against accidental withdrawal. The length of this ring 20 is such that it will project beyond the end of the spigot 10 and the inside and outside of this outwardly projecting end are rounded or beveled off. A corresponding recess 22 is provided in the faucet or female end of the coupling to receive the outwardly projecting end of the rubber joint ring 20. With this ring in place the spigot may be inserted in the faucet and being partially turned to lock it, the end of the ring 20 will fit into the recess 22, but although fitting closely in that recess it is not intended to depend on the tightness of its fit to effect the closure, but when a fluid pressure is admitted to the pipes the rubber ring 20 being thin and elastic will be expanded outward by the pressure and the joint will be effectively closed.

It will be noticed that the lip of the groove 22 projects inside the ring 20, when in place. This is designed to obviate the possibility of a flow of water around the end of the ring before the pressure comes upon it in sufficient force to expand it to make a tight closure. A simple and effective coupling is thus provided that is free from any external projections to obstruct its free endwise movement and that is neat in appearance. Although described as attached to a hose pipe, for fire purposes one part, preferably the female or faucet end, may obviously be secured to the hydrant.

Having now particularly described the invention, and having drawn attention to the essential features of its construction, I hereby declare that what I claim as new and desire to be protected in by Letters Patent, is:

A two part hose pipe coupling, one part of which is provided with a spigot end having radial projections of uniform thickness, and the other with a faucet end having an internal annular groove of uniform width, and having removed entrant portions to said groove, such projections designed to fit in said groove in the faucet part of the coupling and to be admitted through the removed portions in the end thereof, the spigot end of said coupling having an internal ring, and an internal annular groove adjacent to said ring, a resilient ring held within said spigot end, and having an outer annular bead to fit said internal groove and abut said internal ring, the internal diameter of said spigot ring and said resilient member being equal, said resilient member having its free edge V-shaped in cross section, said faucet member having an internal projecting ring portion provided on one face with a V-shaped groove to receive the free end of said resilient member, and means for latching said spigot and faucet members together.

In testimony whereof I have signed my name to this specification in the presence of two subscribing witnesses.

THEODORE BROOKFIELD.

Witnesses:
 ROWLAND BRITTAIN,
 WM. S. SOUTAR.